(12) United States Patent
Di Blasi et al.

(10) Patent No.: US 7,059,621 B2
(45) Date of Patent: Jun. 13, 2006

(54) FOLDABLE FRAME FOR A TRICYCLE POWERED BY PHYSICAL FORCE AND/OR A MOTOR

(76) Inventors: Carmelo Di Blasi, Via V. Emanuele, 32, 96015 Francofonte (IT); Carlo Maria Di Blasi, Via Messina, 6, 96015 Francofonte (IT)

( * ) Notice: Subject to any disclaimer, the term of this patent is extended or adjusted under 35 U.S.C. 154(b) by 244 days.

(21) Appl. No.: 10/657,702

(22) Filed: Sep. 9, 2003

(65) Prior Publication Data

US 2004/0130126 A1    Jul. 8, 2004

(30) Foreign Application Priority Data

Sep. 10, 2002  (IT)  ............................ BO2002A0572

(51) Int. Cl.
*B62K 19/00* (2006.01)
(52) U.S. Cl. ...................... 280/287; 280/642
(58) Field of Classification Search ............ 280/281.1, 280/282, 283, 287, 278, 42, 642, 643, 647
See application file for complete search history.

(56) References Cited

U.S. PATENT DOCUMENTS

| | | | |
|---|---|---|---|
| 1,274,045 A * | 7/1918 | Hudry ...................... 280/7.15 |
| 3,887,218 A | 6/1975 | Di Blasi | |
| 5,145,196 A * | 9/1992 | Langkamp ................... 280/278 |
| 5,669,623 A * | 9/1997 | Onishi ......................... 280/642 |
| 5,855,387 A * | 1/1999 | Gill et al. ................... 280/283 |
| 6,325,406 B1 * | 12/2001 | O'Shea et al. ............. 280/642 |
| 6,659,488 B1 * | 12/2003 | Beresnitzky et al. ........ 280/282 |
| 6,811,178 B1 * | 11/2004 | Tomasi et al. ............. 280/650 |

FOREIGN PATENT DOCUMENTS

| | | |
|---|---|---|
| EP | 0 648 667 A1 | 4/1995 |
| EP | 1 086 888 A2 | 3/2001 |
| WO | WO 99/38759 | 8/1999 |

OTHER PUBLICATIONS

EPO Search Report, Nov. 2, 2004.

* cited by examiner

*Primary Examiner*—Christopher P. Ellis
*Assistant Examiner*—Christopher Bottorff
(74) *Attorney, Agent, or Firm*—Hall, Vande Sande & Pequignot

(57) ABSTRACT

A foldable frame for a tricycle powered by physical force and/or a motor; the frame having a number of subframes interconnected to fold the component members of the frame; and the folding of a central subframe of the frame causes two lateral subframes supporting the rear lateral wheels to fold from a first fully unfolded position to a second fully folded position, and vice versa.

22 Claims, 12 Drawing Sheets

FOLDABLE FRAME FOR A TRICYCLE POWERED BY PHYSICAL FORCE AND/OR A MOTOR

The present invention relates to a foldable frame for a three-wheeled vehicle or so-called "tricycle" powered by physical force or a motor. The foldable frame is designed to permit a considerable reduction in size for easy stowage in the luggage compartment of a car, camper, aeroplane, etc.

The present invention also relates to a tricycle comprising such a frame.

BACKGROUND OF THE INVENTION

Foldable tricycle frames are known which are folded and unfolded by hand, at times not without a certain amount of difficulty.

Italian Patent IT-981 018, for example, describes a foldable two-wheel vehicle frame comprising at least a first subframe in the form of an articulated quadrilateral and connected by means of at least one lever to a saddle fitted to a second subframe also in the form of an articulated quadrilateral. By manually deforming the second subframe, e.g. by pushing down the saddle, the first subframe is deformed so that the rear wheel of the vehicle moves towards the front wheel, thus reducing the length of the vehicle.

Italian Patent IT-1 262 538 describes the front subframe of a vehicle with two or more wheels, in which the handlebar and the front wheel are connected by a mechanism, so that, once the handlebar is detached from a fastening hook, downward rotation of the handlebar about a hinge shifts a connecting rod, which in turn rotates the front fork about another hinge, thus simultaneously lowering the handlebar and moving the front wheel back to reduce the length and height of the vehicle.

Various documents describe mechanisms whereby each of the two lateral wheels of a tricycle can be moved manually towards the longitudinal plane of symmetry of the tricycle to reduce its width.

None of the above documents, however, considers the possibility of deforming the lateral subframes supporting the two lateral wheels of the tricycle, by deforming the central subframe of the tricycle.

SUMMARY OF THE INVENTION

It is therefore an object of the present invention to provide a convenient solution to the problem of folding and unfolding a tricycle frame, and which permits troublefree folding and unfolding, even by users with minor physical handicaps.

In other words, the present invention relates to a foldable frame for a three-wheeled vehicle (tricycle) powered by physical force or a motor, which incorporates a number of mechanisms for simultaneously reducing the size of the various subframes defining the foldable frame.

It should be stressed that, though some of the mechanisms referred to are known from the aforementioned documents, they are interconnected in the present invention to permit congruent size reductions of the various subframes and component parts.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
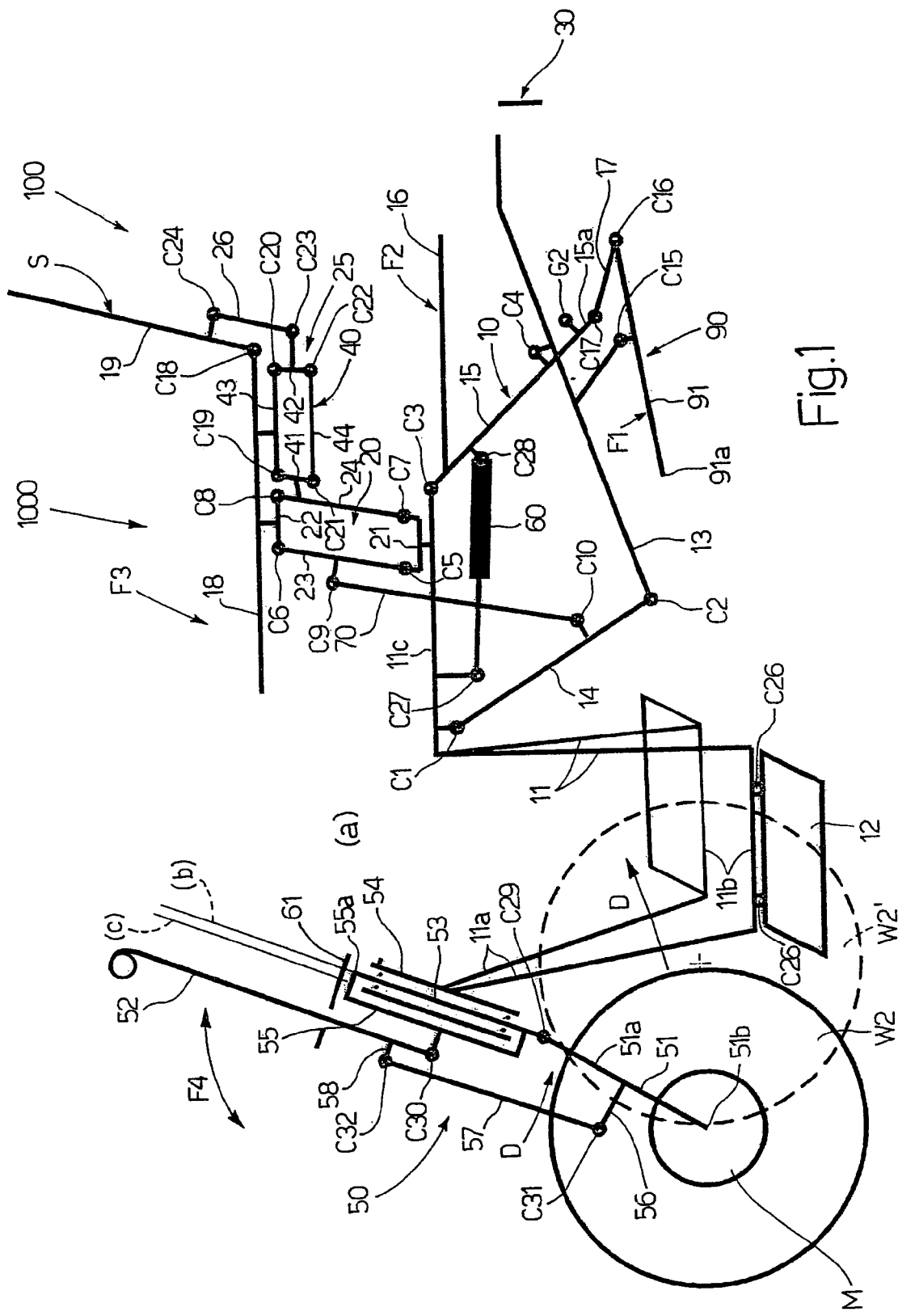
FIG. 1 shows a diagram of the frame according to the present invention as a whole.

In the present context, the following expressions are to be understood as follows:

"fully unfolded position": the position of the frame as a whole, or of any one subframe defining the frame, in which the component elements are fully extended to define a maximum-size condition of the frame, or of parts of it, in which the frame and, therefore, the tricycle are ready for use;

"partly unfolded position" (or "partly folded position"): the position of the frame as a whole, or of any one subframe defining the frame, in which the component elements are only partly extended;

"fully folded position": the position of the frame as a whole, or of any one subframe defining the frame, in which the component elements are fully collapsed to define a minimum-size condition of the frame, or of parts of it, which is particularly useful for transport and/or stowage of the tricycle.

Number 1000 in the accompanying drawings indicates a tricycle comprising a frame 100 in accordance with the present invention.

Frame 100 in turn comprises a central subframe 10 forming the main subframe on which the other subframes and component elements of frame 100 are mounted.

In addition to central subframe 10, frame 100 also comprises a subframe 20 supporting a seat S; and two rear subframes 30, which are specular with respect to the longitudinal plane (a) of symmetry of frame 100, and each of which is fitted on the end with one of the two rear wheels W1 (FIGS. 2, 5–9, 12).

Frame 100 also comprises a subframe 40 by which to fold the backrest of seat S; and a front assembly 50 relative to the front fork, the direction wheel, and the handlebar of tricycle 1000 (see below).

Tricycle 1000 may also comprise:

an electric actuator 60 (FIG. 1) for automatically folding the whole of frame 100, with the exception of the front fork and handlebar (see below);

an electric drive motor M; and batteries (not shown) for powering electric actuator 60 and electric drive motor M.

The following is a more detailed description of the various subframes and component elements of frame 100.

Firstly, it should be pointed out that subframes 10, 20, 30, 40 are all based on the known "articulated quadrilateral" principle.

Central subframe 10, in fact, is substantially defined by four members 11, 13, 14, 15 arranged in the form of an articulated quadrilateral.

A front portion 11a of member 11 substantially supports a steering tube, which acts as a hinge for the front fork/handlebar assembly (see below); an intermediate portion 11b of member 11 supports two footrests 12 shown in FIG. 1; and a top portion 11c of member 11 supports subframes 20 and 40.

Member 13, opposite member 11, is fitted at the rear with two lateral subframes 30, each supporting a lateral wheel W1 (FIGS. 1 and 2), and which, as stated, are specular with respect to the longitudinal plane (a) of symmetry of frame 100.

Member 14 of central subframe 10 is hinged at one end by a hinge C1 to an intermediate point of member 11 (portion 11c), and at the other end by a hinge C2 to the front portion of member 13.

Member 15 is hinged at one end by a hinge C3 to a point at the rear of member 11 (portion 11c), and at an intermediate point by a hinge C4 to an intermediate point of member 13.

Being, as stated, in the form of an articulated quadrilateral with the axes of hinges C1, C2, C3, C4 perpendicular to plane (a), central subframe 10 can be converted from the unfolded configuration (FIGS. 1, 5) corresponding to the running configuration of tricycle 1000, to a folded configuration (FIG. 7) corresponding to the minimum-size configuration of tricycle 1000.

Devices (not shown) can also be provided to lock frame 100 in each of the two limit configurations.

Figure 7:
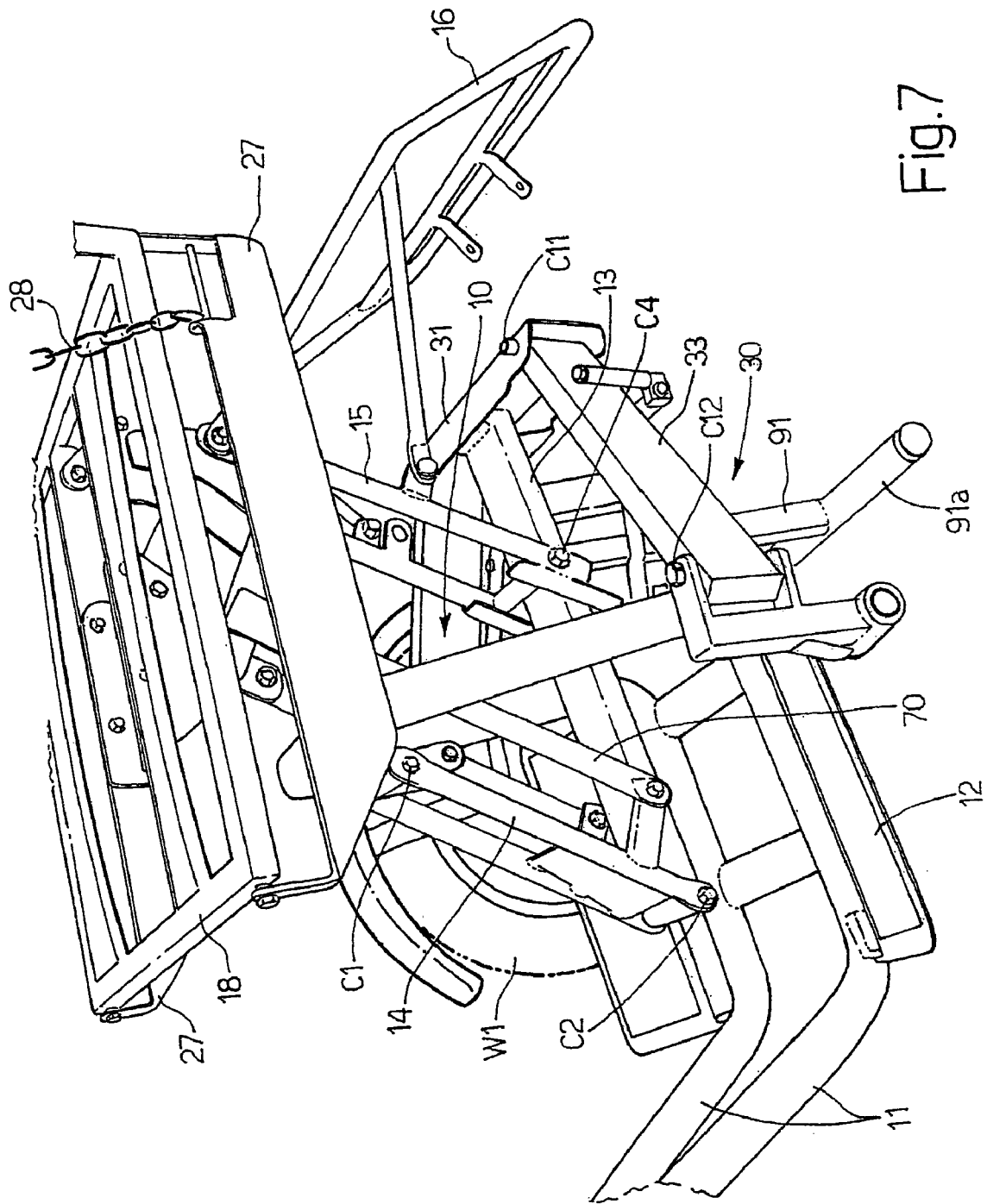
FIG. 7 shows a three-dimensional view of a portion of the tricycle frame in the fully folded position (one lateral wheel is removed for clarity)

A member 16, integral with member 15, serves as a luggage rack when tricycle 1000 is in the running configuration (FIGS. 1, 5), and moves down within the rear outline of tricycle 1000 when frame 100 is folded into the minimum-size configuration (FIG. 7).

As shown more clearly later on, in one particular embodiment, the force required to fold or unfold frame 100 may be transmitted by means of member 16.

Subframe 20 substantially comprises the following four members arranged in the form of an articulated quadrilateral:

a member 21 integral with portion 11c of member 11 of central subframe 10;

a member 22 opposite member 21 and integral with the seat portion of seat S;

a member 23 hinged at one end by a hinge C5 to the front of member 21, and at the other end by a hinge C6 to the front of member 22;

a member 24 opposite member 23 and hinged at the bottom end by a hinge C7 to the rear of member 21, and at the top end by a hinge C8 to the rear of member 22.

Figure 12:
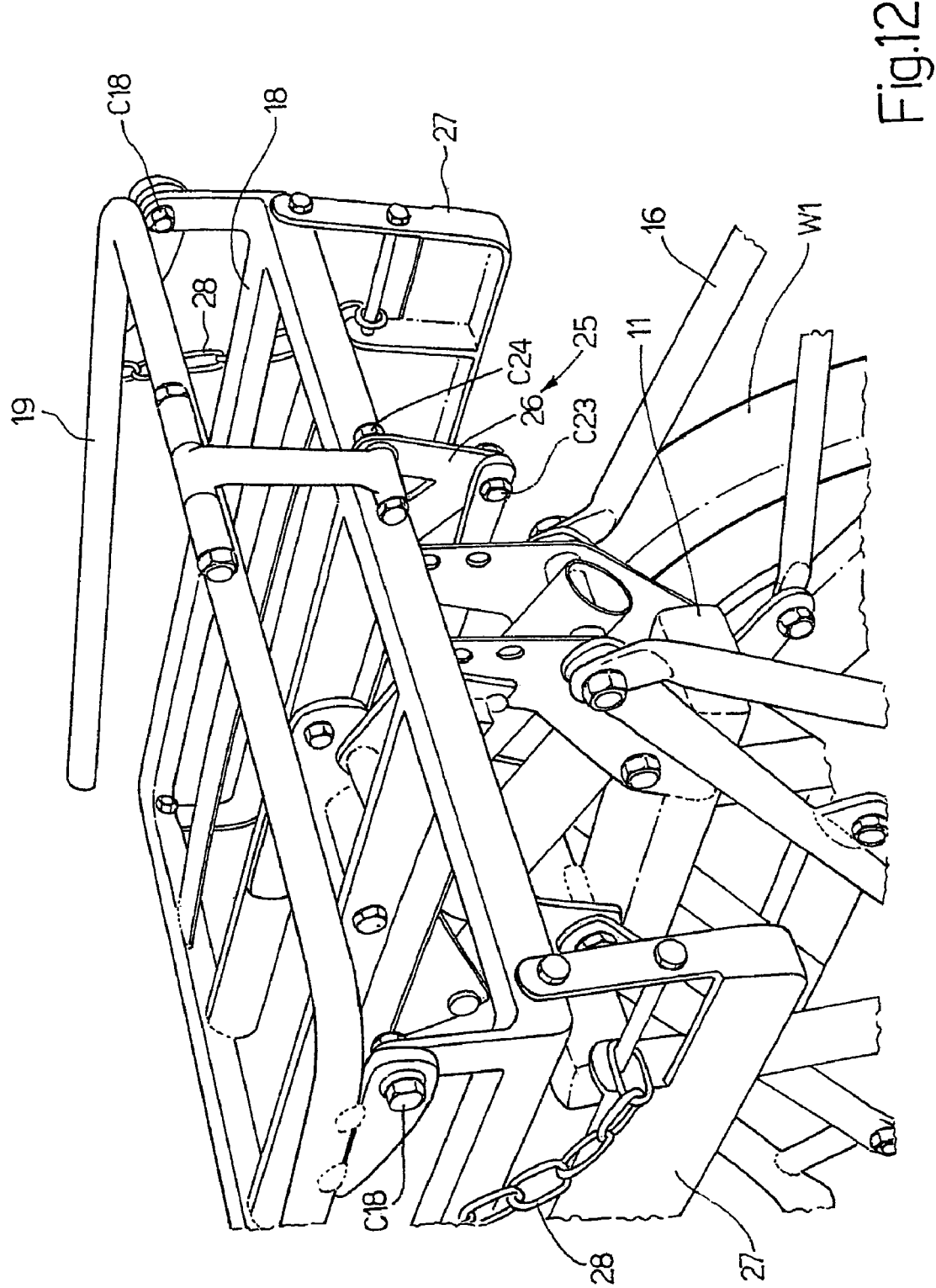

Being, as stated, in the form of an articulated quadrilateral with the axes of hinges C5, C6, C7, C8 perpendicular to plane (a), subframe 20 can be converted from the unfolded configuration (FIGS. 1, 5) corresponding to the running configuration of the tricycle, to a collapsed configuration on top of central subframe 10 and corresponding to the minimum-size configuration of tricycle 1000 (FIGS. 7, 12).

Central subframe 10 is connected to subframe 20 by two connecting rods 70 (only one shown in FIG. 1) specular with respect to the longitudinal plane (a) of symmetry of frame 100.

More specifically, each connecting rod 70 is hinged by a hinge C9 to a projection of member 23 of subframe 20, and at the opposite end by a hinge C10 to a projection of member 14 of central subframe 10.

As such, deformation of either of subframes 10 and 20 shifts connecting rods 70 and so deforms the other subframe (20 or 10), so that each configuration of either of subframes 10 and 20 corresponds to one, and only one, configuration of the other subframe 20 or 10.

More specifically, when one of subframes 10, 20 is moved into the unfolded position corresponding to the running configuration of tricycle 1000 (FIGS. 1, 5), the other subframe 20, 10 also moves into the extended position corresponding to the running configuration of tricycle 1000; and conversely, when one of subframes 10, 20 is deformed into the minimum-size configuration of tricycle 1000 (FIG. 7), the other subframe 20, 10 is also deformed into the minimum-size configuration of tricycle 1000.

As stated, the rear end of member 13 of central subframe 10 is fitted with two lateral subframes 30 specular with respect to the longitudinal plane (a) of symmetry of tricycle 1000.

As shown in more detail in FIG. 2a, each of the two lateral subframes 30 substantially comprises the following four members, also arranged in the form of an articulated quadrilateral:

a first member 31 integral with member 13 of central subframe 10;

a second member 32 opposite first member 31 and supporting wheel W1;

a third member 33 hinged by a hinge C11 to the rear of member 31, and by a hinge C12 to the rear of member 32; and a fourth member 34 hinged by a hinge C13 to the front of member 31, and by a hinge C14 to the front of member 32.

Being in the form of an articulated quadrilateral with the axes of hinges C11, C12, C13, C14 substantially vertical, each of the two lateral subframes 30 can be converted from the fully unfolded configuration (FIGS. 1, 2a, 5) with respect to the longitudinal plane (a) of symmetry of tricycle 1000, to a withdrawn configuration adjacent to plane (a) (FIGS. 2b and 7).

As shown particularly in FIG. 2a, in the fully unfolded configuration, members 33 and 34 are substantially perpendicular to the longitudinal plane (a) of symmetry of tricycle 1000, and wheel W1 is in the running configuration.

Conversely, in the withdrawn configuration in FIGS. 2b and 7, members 33 and 34, and consequently also respective wheel W1, are positioned adjacent to central subframe 10, thus reducing the width of tricycle 1000.

Each lateral subframe 30 is connected to central subframe 10 by a mechanism 80 (FIG. 2a) comprising a connecting rod 81, which is connected at one end to a projection of member 33 by an articulated joint G1, and at the other end by an articulated joint G2 (see also FIG. 1) to an extension 15a of member 15 of central subframe 10.

As such, when central subframe 10 is deformed, the rotation of member 15 with respect to member 13 shifts articulated joint G2 (FIG. 1), and therefore connecting rod 81 of mechanism 80 (FIG. 2a), to deform lateral subframe 30.

A biunique relationship therefore exists between the configuration of central subframe 10 and those of the two lateral subframes 30. Articulated joints G1 and G2 are also so located that, when central subframe 10 is in the unfolded position corresponding to the running configuration of tricycle 1000 (FIGS. 1, 2a, 5), connecting rods 81 secure the two lateral subframes 30, and wheels W1 fitted to them, in the unfolded position corresponding to the running configuration of the tricycle, with members 33 and 34 substantially perpendicular to the longitudinal plane (a) of symmetry of tricycle 1000 (FIG. 2a). Conversely, when central subframe 10 is deformed to collapse tricycle 1000 into the minimum-size configuration (FIGS. 2b and 7), lateral subframes 30 also assume the minimum-size configuration, with members 33, 34 and wheels W1 substantially adjacent to central subframe 10 (FIG. 2b).

Figure 2:
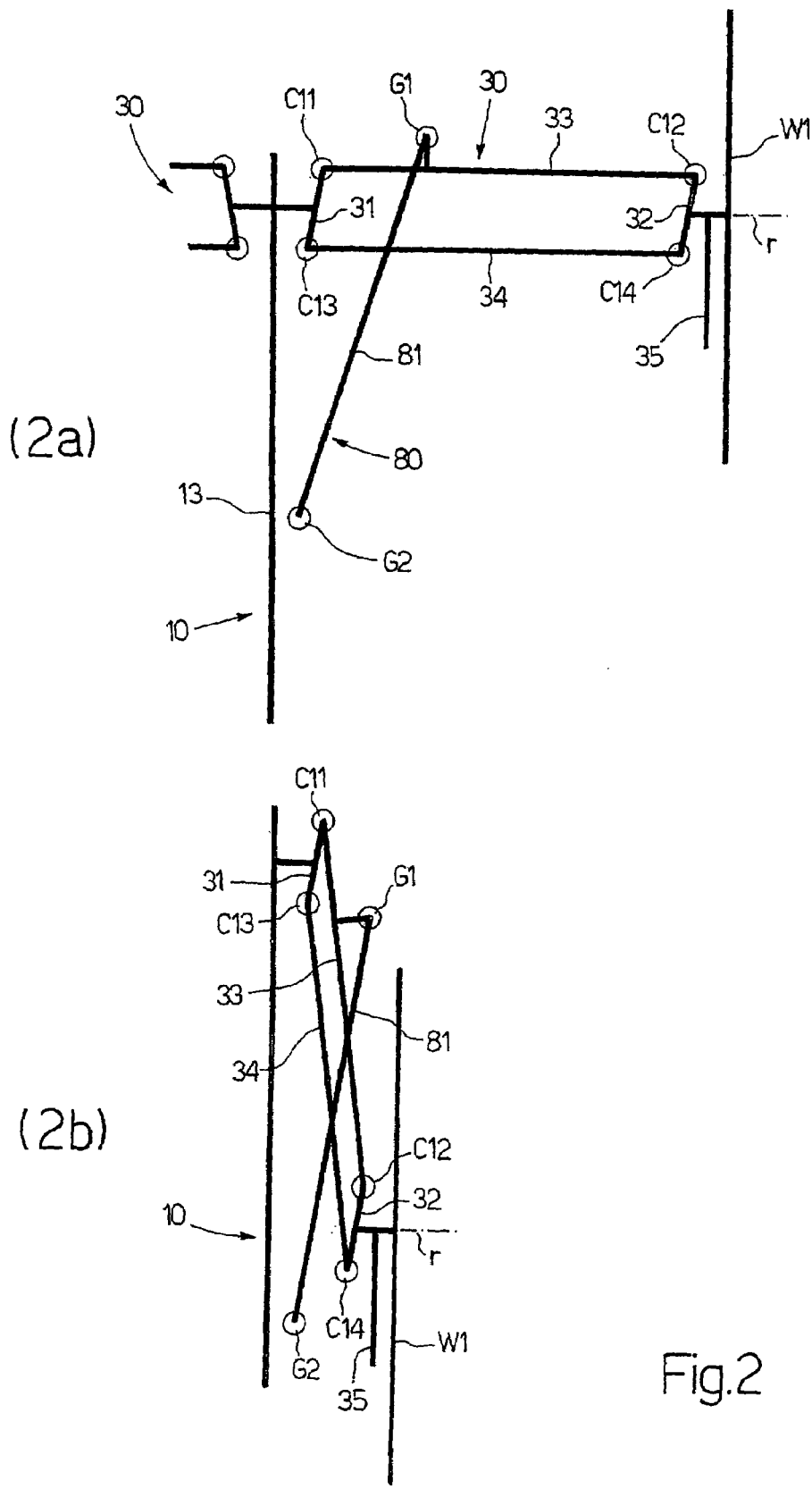
FIG. 2a shows a diagram of an unfolded subframe forming part of the FIG. 1 frame, and which connects each lateral wheel to a central subframe.
FIG. 2b shows the same diagram as in FIG. 2a, but with the subframe in the folded configuration.

Deformation of lateral subframes 30 from the running to the minimum-size configuration of tricycle 1000 and vice versa, however, is made difficult by wheels W1 sliding on the ground, on account of the movement of the wheels, during the above operations, having a component parallel to the axis of rotation (r) of wheels W1, and therefore perpendicular to the longitudinal plane (a) of symmetry of frame 100 (FIG. 2).

Figure 8:
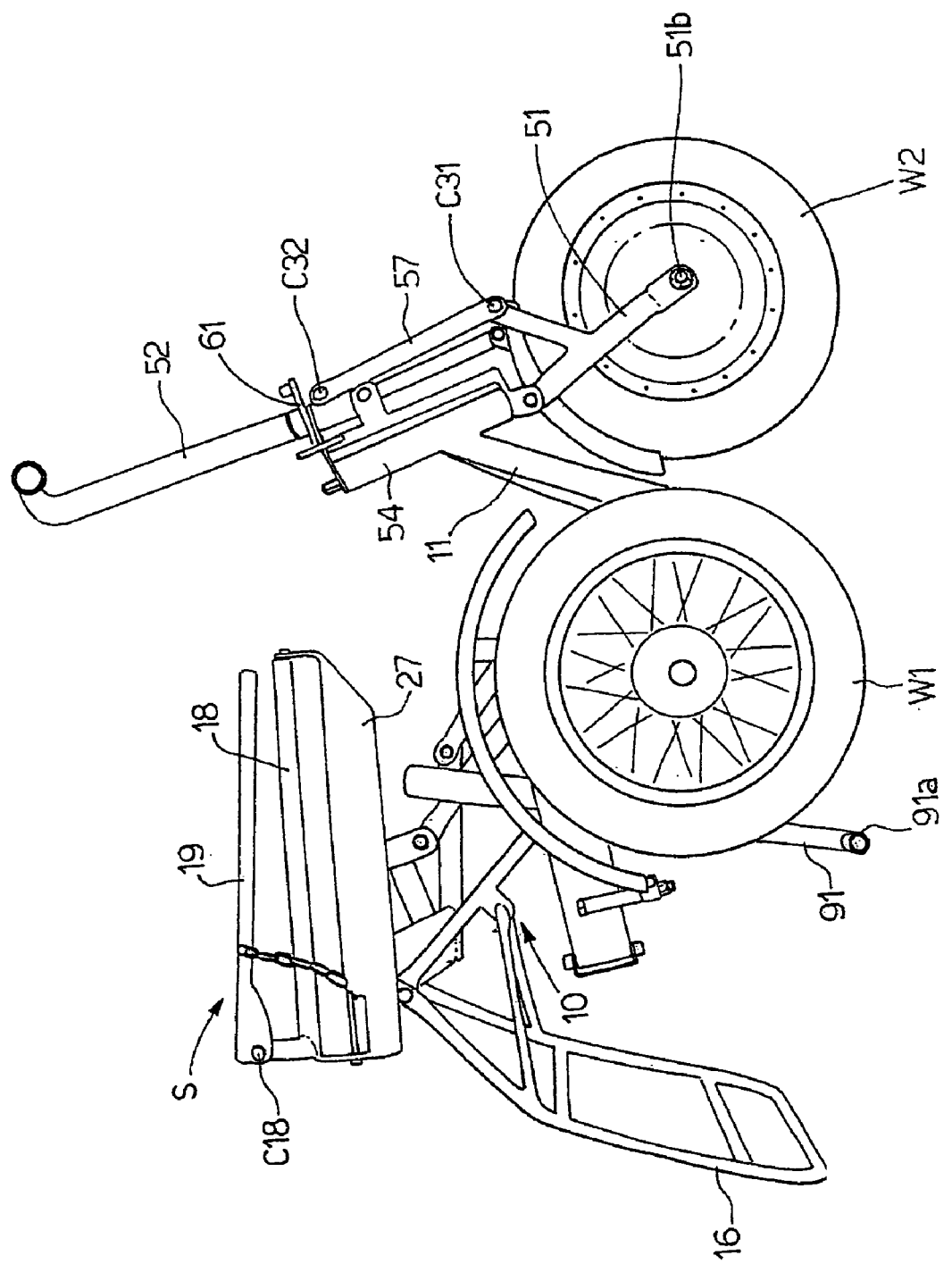
FIG. 8 shows the tricycle frame resting on a supporting member as it is folded, to assist movement of the lateral wheels towards the central subframe.

As shown in FIGS. 1 and 8, this drawback can be eliminated by means of a mechanism 90, which comprises a member 91 hinged by a hinge C15 to a projection of member 13, and by a hinge C16 to one end of a connecting rod 17, the other end of which is hinged by a hinge C17 to the end of an extension of member 15 of central subframe 10.

As such, when central subframe 10 is deformed in the folding direction, rotation of member 15 with respect to member 13 shifts connecting rod 17, which in turn rotates member 91 about hinge C15 with respect to member 13, so that the free end 91a of member 91 is lowered onto the ground to lift the rear of frame 100 of tricycle 1000, and therefore rear wheels W1, off the ground, and so make tricycle 1000 easier to fold (see particularly FIG. 8).

A substantially rectangular seat portion 18 of seat S is fitted integrally to member 22 of subframe 22 and hinged at the rear by a hinge C18 to a backrest 19 of seat S.

Figure 3:
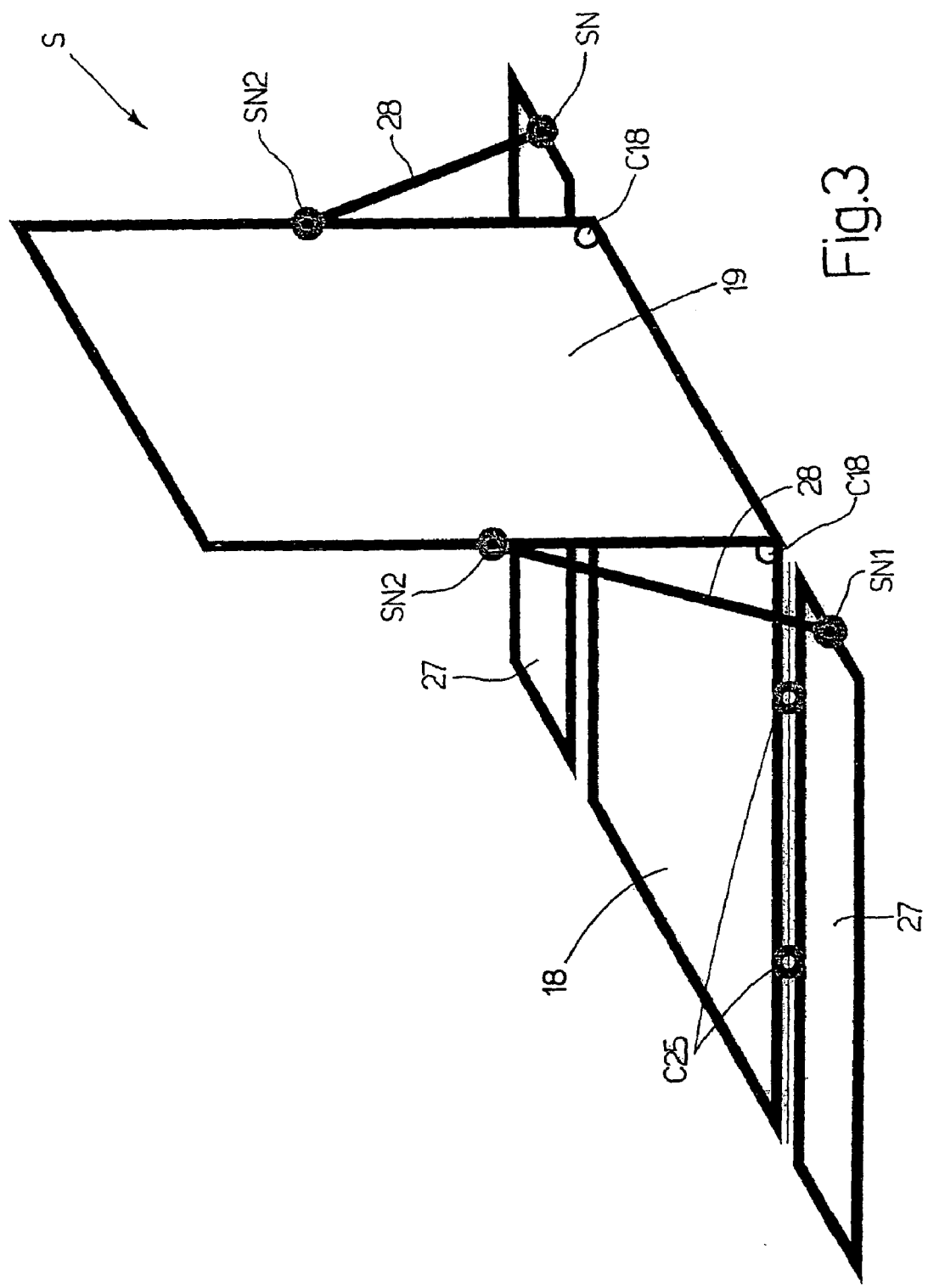
FIG. 3 shows a diagram of the backrest of the seat.
Figure 10:
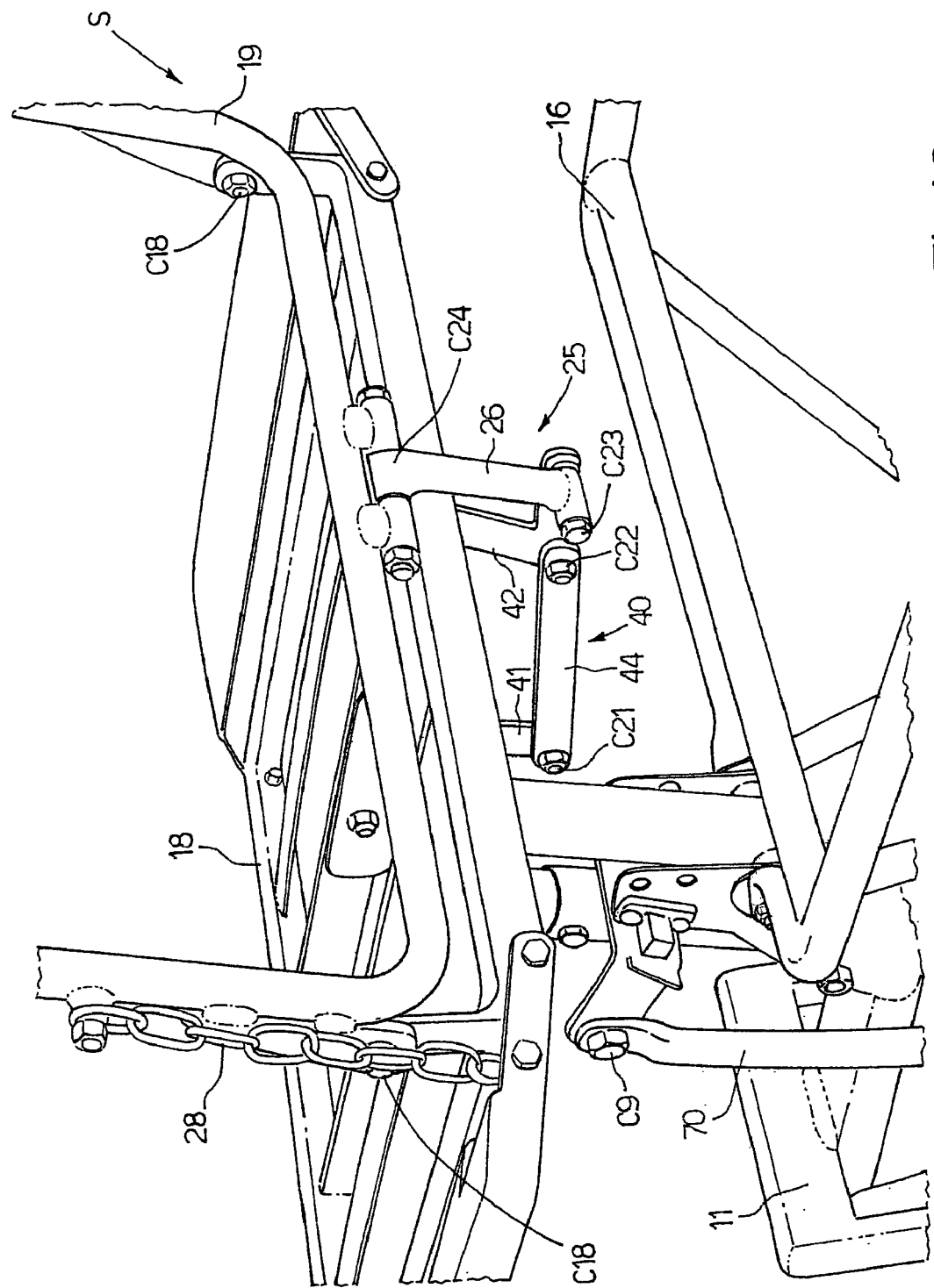
FIGS. 10–12 show the steps by which the backrest and two lateral seat extension members are folded by means of a special mechanism.

To achieve a further reduction in height when frame 100 is folded into the minimum-size configuration, a mechanism 25 is provided to rotate backrest 19 about hinge C18 into a minimum-size configuration lying flat on seat portion 18 (FIG. 12). Conversely, when tricycle 1000 is unfolded into the running configuration, backrest 19 rotates into the erect position (FIGS. 1, 3, 10).

Backrest 19 of seat s is folded using folding mechanism 25, which comprises a subframe 40, in turn comprising the following four members arranged in the form of an articulated quadrilateral:

a first member 41 integral with member 24 of subframe 20;

a second member 42 opposite member 41;

a third member 43 integral with seat portion 18 of seat S and hinged by a hinge C19 to member 41, and by a hinge C20 to member 42; and a fourth member 44 opposite third member 43 and hinged by a hinge C21 to member 41, and by a hinge C22 to member 42.

Member 41 of subframe 40 is integral with member 24 of subframe 20.

Mechanism 25 also comprises a connecting rod 26 hinged at one end by a hinge C23 to a projection of member 42, and at the other end by a hinge C24 to a projection of backrest 19 of seat S.

As such, each deformation of subframe 20 corresponds to a deformation of subframe 40 of folding mechanism 25 and displacement of connecting rod 26, which rotates backrest 19 about hinge C18 onto seat portion 18, as shown in detail in FIG. 12.

The configuration of subframe 20 therefore corresponds at all times to the configuration of mechanism 25 and backrest 19, so that, when subframe 20 lies flat on member 11 of central subframe 10 in the minimum-size configuration of the tricycle, backrest 19 also lies flat on seat portion 18 in the minimum-size configuration. Conversely, when subframe 20 is unfolded upwards into the running configuration of tricycle 1000, so that seat s also assumes the as-used configuration, backrest 19 moves into a substantially erect as-used position.

As shown in FIG. 3, to make seat S more comfortable, two lateral supporting members 27 are provided to increase the width of seat s in the as-used configuration, but which fold into a minimum-size configuration when tricycle 1000 is also folded into the minimum-size configuration.

Each of the two lateral members 27 is substantially rectangular, and is hinged to one side of seat portion 18 by a hinge C25 having a substantially horizontal axis of rotation parallel to the longitudinal plane (a) of symmetry of seat S. A member 28, having an articulated endpiece SN1 at one end and an articulated endpiece SN2 at the other end, connects a point, having a sufficient arm with respect to the axis of hinge C25, on lateral member 27 to a point, having a sufficient arm with respect to the axis of hinge C18, on the corresponding side of backrest 19, and may be defined by a straightforward chain.

Figure 11:
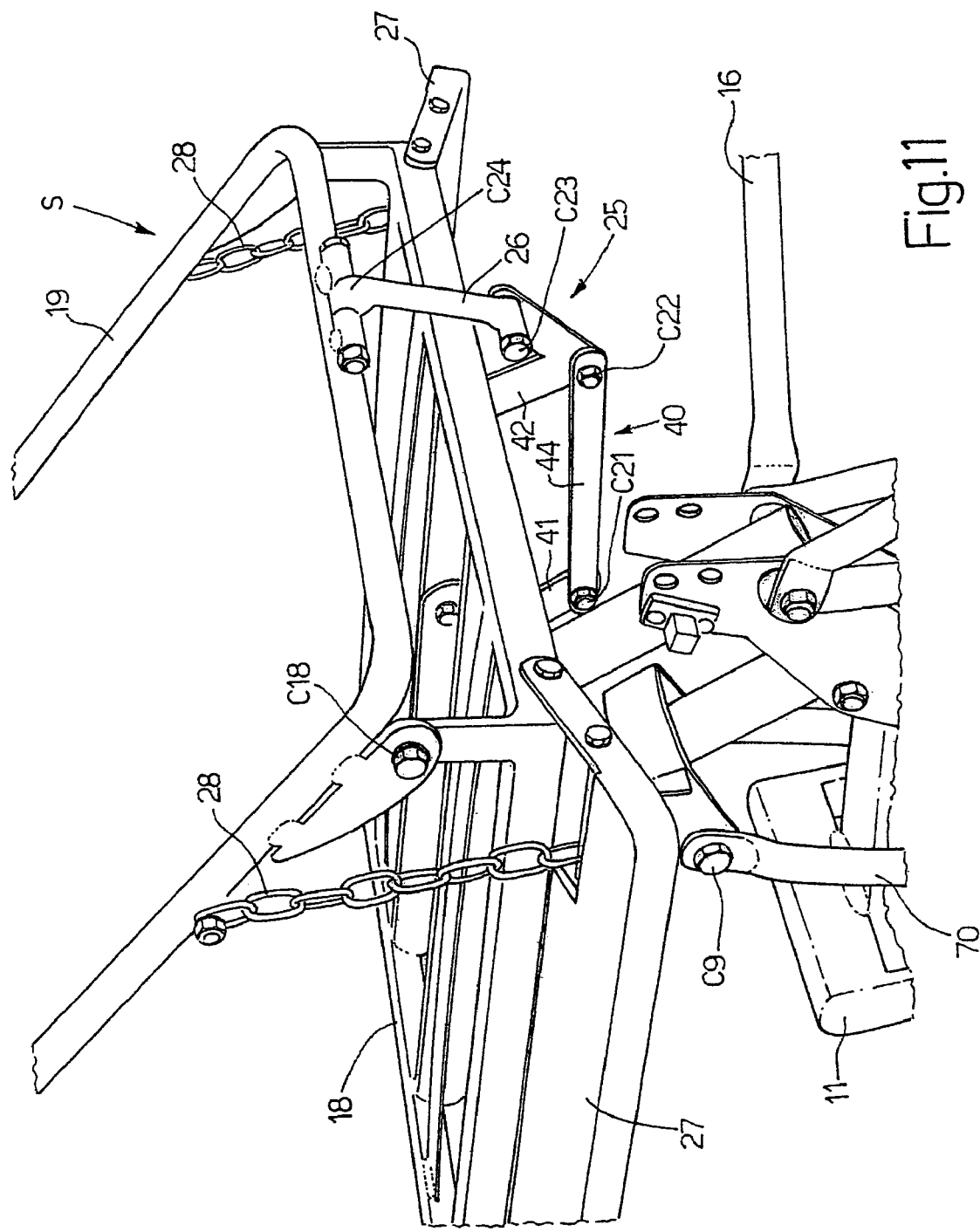

As shown in FIGS. 10–12, when backrest 19 is in the erect as-used position, the two members 28 keep lateral supporting members 27 in an open configuration substantially coplanar with seat portion 18 (FIG. 3) to widen and so make the seat portion more comfortable. Conversely, when backrest 19 is turned down about hinge C18 onto seat portion 18 of seat S, the resulting movement of the two members 28 allows lateral members 27 to rotate downwards, so that the transverse dimension of the lateral members is substantially zero.

As stated, portion 11b of member 11 of central subframe 10 is fitted at the bottom with two substantially rectangular footrests 12 (FIGS. 1, 5, 6, 9) arranged specularly with respect to the longitudinal plane (a) of symmetry of frame 100.

Each footrest 12 is hinged to portion 11b by a hinge C26 having a substantially horizontal axis of rotation parallel to the longitudinal plane (a) of symmetry of tricycle 1000.

When tricycle 1000 is folded into the minimum-size configuration, footrests 12 must also be set to a minimum-size configuration, which is done by rotating footrests 12 about hinges C26 from the horizontal as-used position to a substantially vertical position of maximum compactness with respect to plane (a).

Figure 9:
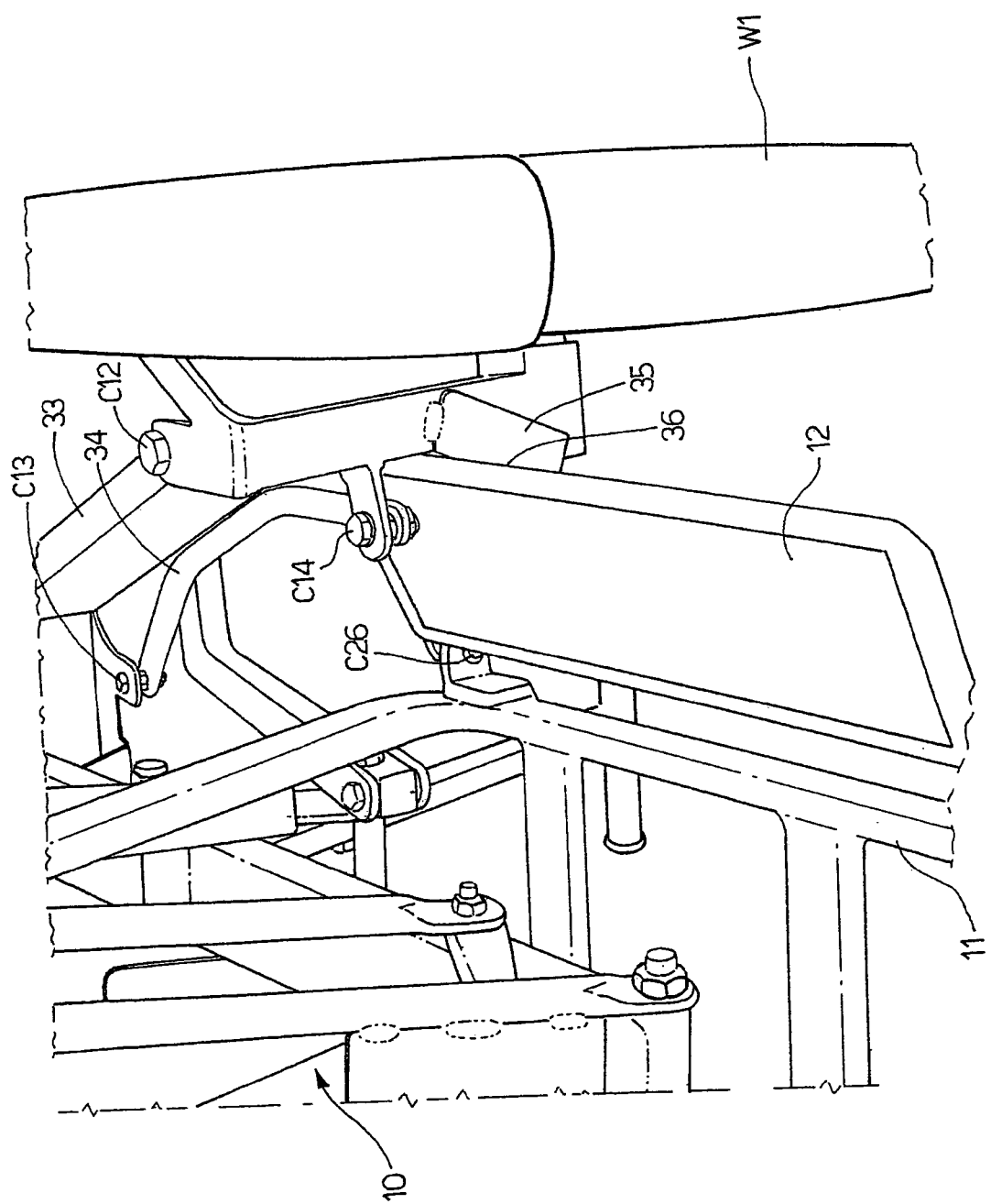
FIG. 9 shows the working of a device for folding a lateral footrest.

As shown particularly in FIGS. 2 and 9, the above rotation may be performed automatically when frame 100 is folded into the minimum-size configuration, as stated, by appropriately deforming interconnected subframes 10, 20, 30 and 40.

For which purpose, member 32 of each lateral subframe 30 comprises a projection 35 integral with member 32 and so located that, when lateral subframe 30 is deformed from the extended running configuration to the minimum-size configuration, projection 35 slides along an inclined surface 36 (FIG. 9) formed on footrest 12, so that footrest 12 rotates about hinge C26 from a substantially horizontal as-used position to a substantially vertical minimum-size position. Conversely, when lateral subframe 30 is extended from the minimum-size configuration to the running configuration of the tricycle, projection 35 releases footrest 12, which returns, by force of gravity, to the horizontal as-used position, in which it is arrested by appropriate locking devices (not shown in FIG. 1) formed on portion 11b of member 11 of central subframe 10.

As stated, central subframe 10 may be equipped with a linear actuator 60 powered by an electric d.c. motor in turn powered by batteries (not shown) housed, for example, beneath luggage rack member 16.

Actuator 60 is hinged at one end by a hinge C27 to a projection of portion 11c of member 11, and at the other end by a hinge C28 to a projection of member 15, so that each extension of linear actuator 60 corresponds to one, and only one, configuration of central subframe 10. More specifically, in the extended configuration, linear actuator 60 braces central subframe 10 in the extended configuration corresponding to the running configuration of tricycle 1000, whereas, in the withdrawn configuration, linear actuator 60 braces central subframe 10 in the deformed configuration corresponding to the minimum-size configuration of tricycle 1000.

To fold frame 100 manually (if no actuator is provided), this can be done, for example, in two ways:
  by rotating luggage rack member 16 about hinge C3 to deform central subframe 10, i.e. as shown in FIG. 1, by lowering member 91 by applying a force F1 (FIG. 1) with one hand, and simultaneously lowering luggage rack member 16 by applying a force F2 with the other hand; or
  by pushing seat s forward to deform subframe 20, i.e. by exerting a force F3 on seat s to lower it (FIG. 1).

In both cases, functionally interconnected subframes 10, 20, 30 and 40 are deformed simultaneously.

As shown in FIG. 1, the front steering assembly 50 of frame 100 substantially comprises a front fork 51, a front direction wheel W2, and a handlebar 52.

The component members of front steering assembly 50 are assembled as follows:
  a sleeve 53 rotates inside a steering tube 54 integral with portion 11a of member 11 of central subframe 10, with its axis of rotation (b) lying in the longitudinal plane (a) of symmetry of frame 100 and slightly tilted with respect to the vertical in accordance with standard cycle design techniques; sleeve 53 is mounted inside steering tube 54 by means of bearings, which prevent it from sliding along, while allowing it to rotate without friction about, axis (b);
  a C-shaped member 55 is fitted integrally to sleeve 53; front fork 51 is defined by two members 51a (only one shown in FIG. 1) specular with respect to the longitudinal plane (a) of symmetry of frame 100; the bottom ends 51b of members 51a are fitted with front wheel W2; and the top ends, integral with each other, of members 51a are hinged to C-shaped member 55 by a hinge C29, the axis of rotation of which is perpendicular to the longitudinal plane of symmetry of wheel W2;
  handlebar 52 is hinged to a projection of C-shaped member 55 by a hinge C30, the axis of rotation of which is advantageously parallel to the axis of rotation of hinge C29;
  each of the two members 51a defining front fork 51 has an integral projection 56, to which is hinged by a hinge C31 one end of a connecting rod 57, the other end of which is hinged by a hinge C32 to the end of a projection 58 of handlebar 52.

As such (FIG. 1), rotation of handlebar 52 about hinge C30 (by applying a force F4) shifts connecting rods 57, which in turn rotate fork 51 about hinge C29.

Hinges C30, C31 and C32 are so located that, when handlebar 52 is in the raised running position, fork 51 is also forced into the running position; whereas, when handlebar 52 is folded down into the minimum-size position, front fork 51 is folded rearwards (in direction D) into the minimum-size configuration, in which wheel W2 is inserted between the two arms defining each of portions 11a, 11b of member 11, in the position shown by the dash line in FIG. 1 (wheel W2'), thus greatly reducing the length and height of frame 100.

Figure 4:
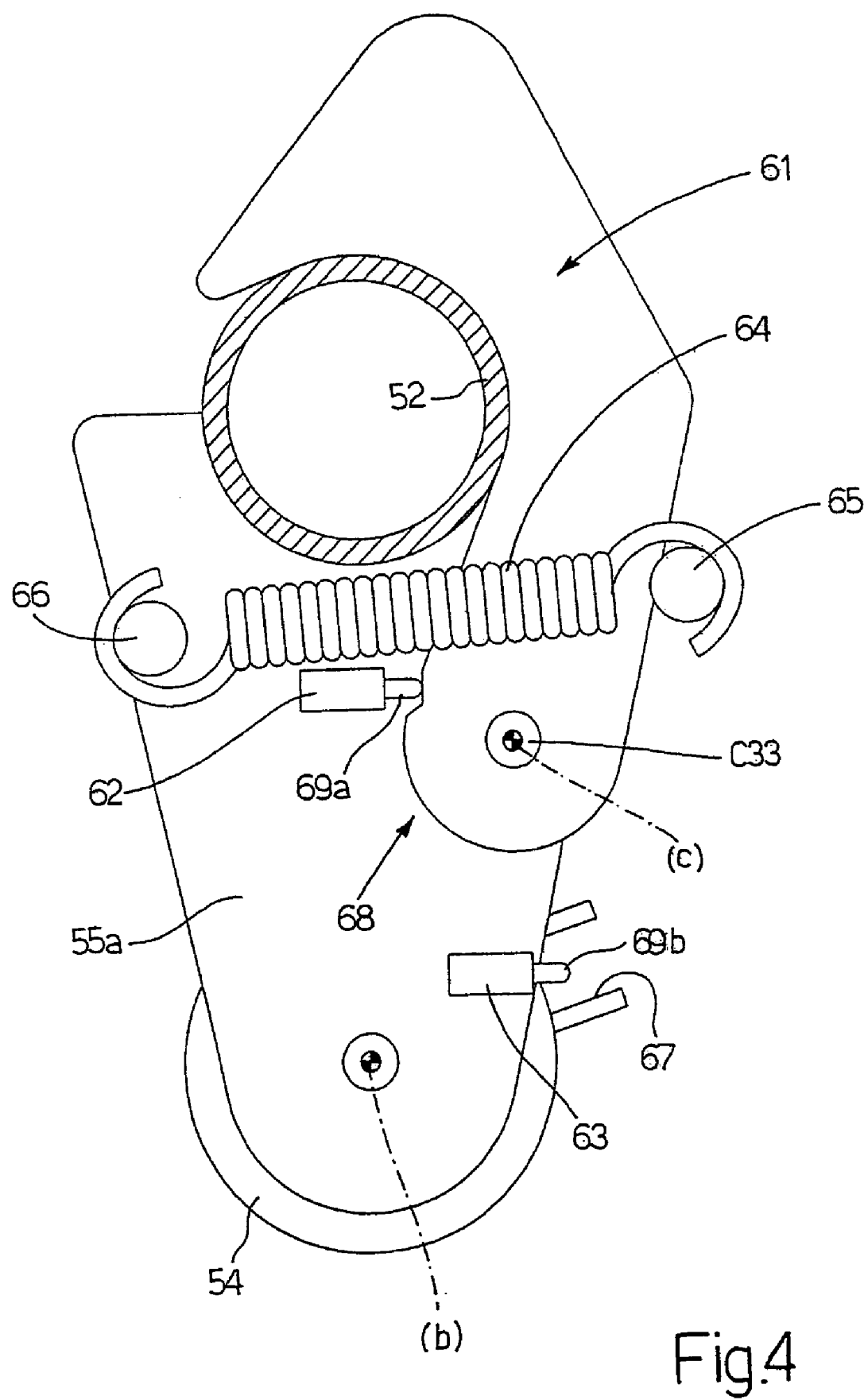
FIG. 4 shows a handlebar fastening device.
Figure 5:
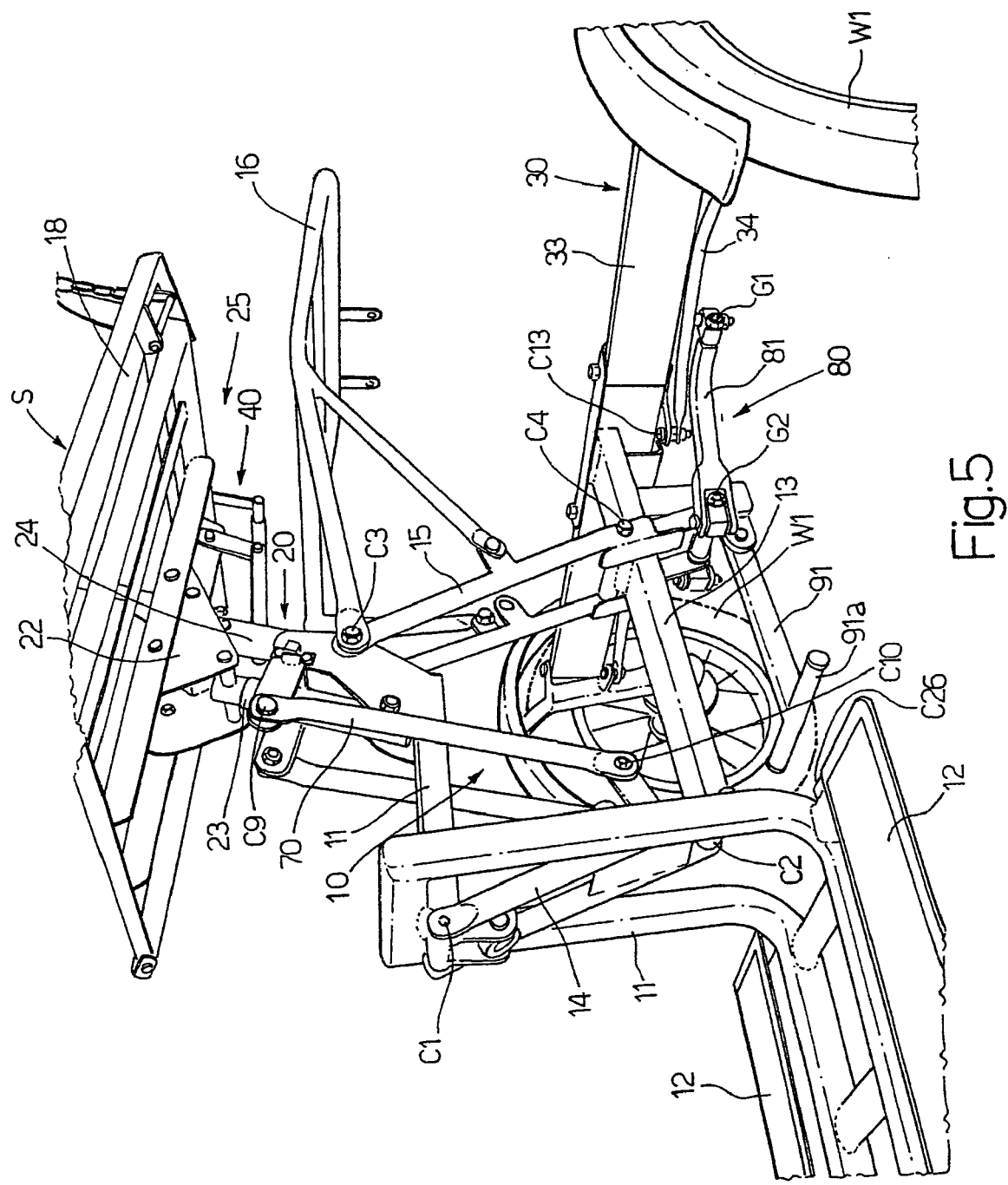
FIG. 5 shows a three-dimensional view of a portion of the tricycle frame in the fully unfolded position.
Figure 6:
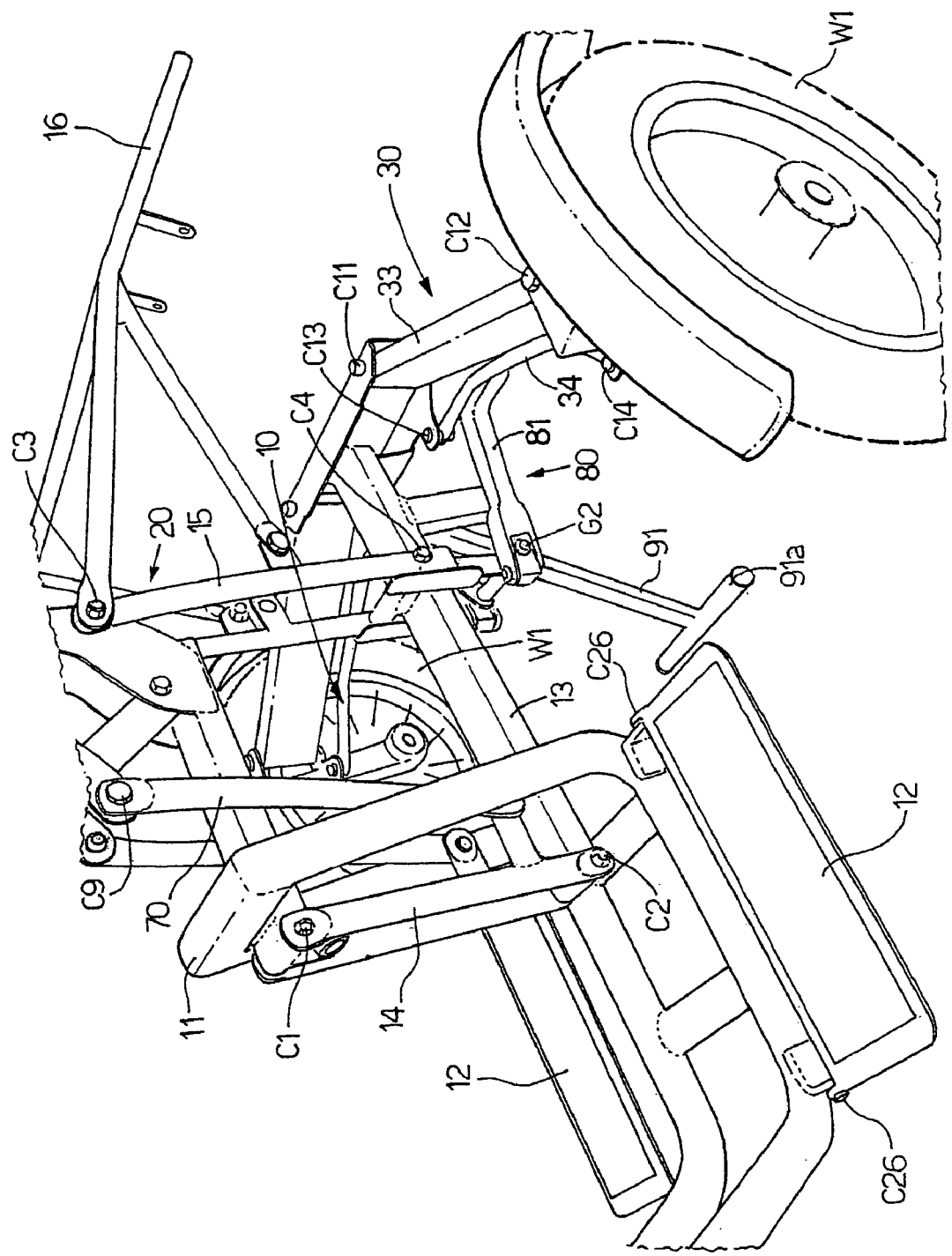
FIG. 6 shows a three-dimensional view of a portion of the tricycle frame in the partly unfolded or partly folded position.

As shown in FIGS. 1 and 4, a hook 61 is hinged to a portion 55a of member 55 by a hinge C33 having an axis (c) substantially parallel to the axis of rotation (b) of sleeve 53.

Hook 61 rotates about axis (c) along an arc of rotation bounded at one end by a first stop member 62 integral with portion 55a of member 55, and at the other end by a second stop member 63 also integral with portion 55a.

A spring 64 is hooked at one end to a projection 65 of hook 61, and at the other end to a projection 66 of portion 55a of member 55, so that hook 61 is forced to stably assume only the above two limit configurations.

When resting against first stop member 62 (hereinafter referred to as the "closed" position of hook 61) as shown in FIG. 4, hook 61 prevents handlebar 52 from rotating about hinge C30 (FIG. 1), and locks it in the running position; whereas, when hook 61 rests against second stop member 63 (hereinafter referred to as the "open" position of hook 61), handlebar 52 is allowed to rotate about hinge C30.

When hook 61 is open, projection 65 (which extends on both sides with respect to the thickness of hook 61) fits inside a seat 67 integral with steering tube 54 integral with member 11 of central subframe 10.

C-shaped member 55 is thus prevented from rotating about axis (b) of sleeve 53, by hook 61 connecting hinge C33 on member 55 to seat 67 integral with steering tube 54.

In other words, when hook 61 is open, handlebar 52 can be folded frontwards about hinge C30, and is prevented from rotating about axis (b) by member 55, which supports handlebar 52, being connected as described above to steering tube 54 integral with member 11 of central subframe 10.

The angular position of seat 67 determines the angular position in which C-shaped member 55 is locked with respect to steering tube 54. More specifically, seat 67 is so located that member 55 is locked in a position in which the axis of hinge C29, integral with member 55, is perpendicular to the longitudinal plane (a) of symmetry of tricycle 1000. In this configuration, when handlebar 52 is lowered from the running to the minimum-size position, front fork 51 rotates about hinge C29, so that the plane of symmetry of wheel W2 is substantially coincident with the longitudinal plane (a) of symmetry of the tricycle.

Foldable tricycle 1000 according to the present invention may be driven by an electric d.c. motor M, which may be housed, for example, in the hub of front wheel W2 (FIG. 1), and which is powered by batteries (not shown) located, for example, beneath luggage rack member 16.

Tricycle 1000 is also equipped with an electric system (not shown) for controlling motor M and linear actuator 60 to perform the functions described previously.

A safety device 68 prevents operation of actuator 60 to fold frame 100 when hook 61 is closed, and prevents operation of motor M when hook 61 is open.

Safety device 68 (FIG. 4) substantially comprises a switch 69a fixed to projection 62 and connected to the electric circuit powering actuator 60. When closed, hook 61 presses against switch 69a to cut off the electric circuit to, and so prevent operation of, actuator 60.

Conversely, when open, hook 61 presses against a switch 69b to cut off the electric circuit to, and so prevent operation of, motor M.

The invention claimed is:

1. A foldable frame (100) for a tricycle (1000) powered by a force selected from the group consisting of: a physical force; a motor; and a combination of a physical force and a motor
    the frame (100) comprising a number of subframes interconnected to fold the component members of said frame (100); and the frame (100) being characterized in that, by folding a central subframe (10) by exerting a force on it, two lateral subframes (30) supporting rear lateral wheels (W1) are folded from a first fully unfolded configuration to a second fully folded configuration; and, conversely, by unfolding the central subframe (10), the lateral subframes (30) are also unfolded; and
    characterized in that each of said two lateral subframes (30) is connected functionally to said central subframe (10) by a first mechanism (80), so that deformation of said central subframe (10) is unequivocally related to that of said two lateral subframes (30), and each configuration of said central subframe (10) corresponds to one, and only one, configuration of said two lateral subframes (30); and, when said central subframe (10) is deformed into a fully unfolded configuration corresponding to a running configuration of said tricycle (1000), said two lateral subframes (30) assume the fully unfolded configuration corresponding to the running configuration of the tricycle (1000); whereas, conversely, when the central subframe (10) is deformed into a fully folded configuration, the two lateral subframes (30) are collapsed against the central subframe (10) into a minimum-size configuration of the tricycle (1000); and
    characterized in that, each lateral wheel (W1), said first mechanism (80) comprises a first connecting rod (81) connected at one end by an articulated joint (G2) to a member (15) of said central subframe (10), and at the other end by another articulated joint (G1) to a member (33) of the respective lateral subframe (30), so that the movements of the first connecting rod (81) induced by rotation of the member (15) of the central subframe (10) produce corresponding deformations of the respective lateral subframe (30).

2. A frame (100) as claimed in claim 1 characterized in that the central subframe (10) is moved from the fully unfolded to the fully folded configuration and vice versa by applying a force (F2) on a member (15) of said central subframe (10).

3. A frame (100) as claimed in claim 2, characterized in that said force (F2) is applied on a member (16) projecting from said member (15) of said central subframe (10).

4. A foldable tricycle (1000), characterized by comprising a frame (100) as claimed in claim 1.

5. A foldable frame (100) for a tricycle (1000) powered by a force selected from the group consisting of: a physical force; a motor; a combination of a physical force and a motor;
    the frame (100) comprising a number of subframes interconnected to fold the component members of said frame (100); and the frame (100) being characterized in that, by folding a central sub frame (10) by exerting a force on it, two lateral subframes (30) supporting rear lateral wheels (W1) are folded from a first fully unfolded configuration to a second fully folded configuration; and, conversely, by unfolding the central subframe (10), the lateral subframes (30) are also unfolded; and
    characterized in that the central subframe (10) is moved from the fully unfolded to the fully folded configuration and vice versa by deforming a first subframe (20) connected functionally to said central subframe (10) by a second connecting rod (70).

6. A frame (100) as claimed in claim 5, characterized in that said first subframe (20) is deformed by moving a seat (S) connected to it.

7. A foldable frame (100) for a tricycle (1000) powered by a force selected from the group consisting of: a physical force; a motor; a combination of a physical force and a motor;
    the frame (100) comprising a number of subframes interconnected to fold the component members of said frame (100); and the frame (100) being characterized in that, by folding a central subframe (10) by exerting a force on it, two lateral subframes (30) supporting rear lateral wheels (W1) are folded from a first fully unfolded configuration to a second fully folded configuration; and, conversely, by unfolding the central subframe (10), the lateral subframes (30) are also unfolded; and
    characterized in that the central subframe (10) is moved from the fully unfolded to the fully folded configuration and vice versa by means of actuating means (60) acting between two members (11, 15) of said central subframe (10); and
    characterized in that said actuating means (60) are hinged by a hinge (C27) to one (11) of said two members, and by a hinge (C28) to the other (15) of said two members, so that each extension of the actuating means (60) corresponds to one, and only one, configuration of the central subframe (10); and when extended, said actuating means (60) brace the central subframe (10) in the fully unfolded configuration corresponding to the running configuration of the tricycle, whereas, when withdrawn, said actuating means (60) brace the central subframe (10) in the fully folded configuration corresponding to the minimum-size configuration of the tricycle (1000); said variations in the position of the central subframe (10) producing corresponding variations in the position of the subframes (20, 30) and folding members connected to it.

8. A foldable frame (100) for a tricycle (1000) powered by a force selected from the group consisting of: a physical force; a motor; a combination of a physical force and a motor;
    the frame (100) comprising a number of subframes interconnected to fold the component members of said frame (100); and the frame (100) being characterized in that, by folding a central subframe (10) by exerting a force on it, two lateral subframes (30) supporting rear lateral wheels (W1) are folded from a first fully unfolded configuration to a second fully folded configuration; and, conversely, by unfolding the central subframe (10), the lateral subframes (30) are also unfolded; and characterized in that the central subframe (10) is moved from the fully unfolded to the fully folded configuration and vice versa by means of actuating means (60) acting between two members (11, 15) of said central subframe (10); and characterized in that said actuating means (60) are electric.

9. A foldable frame (100) for a tricycle (1000) powered by a force selected from the group consisting of: a physical force; a motor; a combination of a physical force and a motor;

the frame (100) comprising a number of subframes interconnected to fold the component members of said frame (100); and the frame (100) being characterized in that, by folding a central subframe (10) by exerting a force on it, two lateral subframes (30) supporting rear lateral wheels (W1) are folded from a first fully unfolded configuration to a second fully folded configuration; and, conversely, by unfolding the central subframe (10), the lateral subframes (30) are also unfolded; and characterized by also comprising a second mechanism (90) for lifting said two rear lateral wheels (W1) off the ground during the folding operations; said second mechanism (90) comprising a member (91) hinged by a hinge (C15) to a first member (13) of said central subframe (10), and hinged by a hinge (C16) to one end of a third connecting rod (17), the other end of which is hinged by a hinge (C17) to a second member (15) of said central subframe (10), so that, as said central subframe (10) is being folded to reduce its size, rotation of its second member (15) with respect to its first member (13) moves the third connecting rod (17) so as to rotate said member (91) of said second mechanism about a hinge (C15) with respect to the first member (13), so that a free end (91a) of said member of said second mechanism is lowered onto the ground to lift the rear of the frame (100) of the tricycle (1000), and therefore the two rear lateral wheels (W1), and so assist movement of the two rear lateral wheels towards the central subframe (10).

10. A foldable frame (100) for a tricycle (1000) towered by a force selected from the group consisting of: a physical force; a motor; a combination of a physical force and a motor;

the frame (100) comprising a number of subframes interconnected to fold the component members of said frame (100); and the frame (100) being characterized in that, by folding a central subframe (10) by exerting a force on it, two lateral subframes (30) supporting rear lateral wheels (W1) are folded from a first fully unfolded configuration to a second fully folded configuration; and, conversely, by unfolding the central subframe (10), the lateral subframes (30) are also unfolded; and the frame (100) comprising a seat (S) having a seat portion (18) and a backrest (19) hinged to each other by a hinge (C18); said backrest (19) being foldable onto a seat portion (18); and the frame (100) being characterized by comprising a third mechanism (25) for automatically so folding said backrest (19) when the subframes defining the frame (100) are deformed to reduce their size; said third mechanism (25) also raising the backrest (19) into the as-used configuration when said subframes are unfolded in the running configuration of the tricycle (1000).

11. A frame (100) as claimed in claim 10, characterized in that said third mechanism (25) comprises a second subframe (40) substantially in the form of an articulated quadrilateral comprising a first member (41) integral with a member (24) of the first subframe (20), a second member (43) integral with said seat portion (18), a third member (44) opposite the second member (43), and a fourth member (42) to which is connected by a hinge (C23) one end of a fourth connecting rod (26), the other end of which is connected by a hinge (C24) to said backrest (19) of said seat (S), so that, when the subframes defining the frame (100) are deformed to reduce their size, the consequent deformation of the second subframe (40) and the consequent relative movement of the fourth connecting rod (26) rotate the backrest (19) about its hinge (C18), so that said backrest (19) rests on the seat portion (18) to reduce the height of the tricycle (1000), whereas, conversely, when the subframes defining the frame (100) are extended into the running configuration of the tricycle (1000), said third mechanism (25) rotates the backrest (19) about its hinge (C18) into an as-used position substantially perpendicular to the seat portion (18).

12. A frame (100) as claimed in claim 11, characterized by comprising, on each of the two sides of the seat portion (18), an extension member (27) for automatically widening the seat portion (18) when the backrest (19) is in the erect running configuration, and which folds into a minimum-size configuration when said backrest (19) is folded into the minimum-size configuration resting on the seat portion (18).

13. A frame (100) as claimed in claim 12, characterized in that each extension member (27) is hinged to one side of said seat portion (18) by a hinge (C25) having a substantially horizontal axis of rotation; each extension member (27) being connected to the corresponding side of the backrest (19) by a retaining member (28), one end of which is connected by a first articulated endpiece (SN1) to the extension member (27), and the other end of which is connected by a second articulated endpiece (SN2) to the corresponding side of the backrest (19), so that, when the backrest (19) is in the erect running configuration, the two retaining members (28) retain the extension members (27) in an open configuration substantially coplanar with the seat portion (18), whereas, when the backrest (19) is lowered onto the seat portion (18), the consequent movement of the two retaining members (28) allows the extension members (27) to rotate downwards, so that their traverse dimension is substantially zero.

14. A foldable frame (100) for a tricycle (1000) powered by a force selected from the group consisting of: a physical force; a motor; a combination of a physical force and a motor;

the frame (100) comprising a number of subframes interconnected to fold the component members of said frame (100); and the frame (100) being characterized in that, by folding a central subframe (10) by exerting a force on it, two lateral subframes (30) supporting rear lateral wheels (W1) are folded from a first fully unfolded configuration to a second fully folded configuration; and, conversely, by unfolding the central subframe (10), the lateral subframes (30) are also unfolded; and also comprising two footrests (12) arranged specularly with respect to a longitudinal plane (a) of symmetry of the tricycle (1000); each footrest (12) being hinged to a respective arm of a member (11) of the central subframe (10) by a hinge (C26) having a substantially horizontal axis of rotation parallel to said longitudinal plane (a) of symmetry of the tricycle (1000); and the frame (100) being characterized by comprising reducing means (35, 36) for reducing the transverse dimension of said footrests (12) when the frame (100) of the tricycle (1000) is deformed into the minimum-size configuration.

15. A frame (100) as claimed in claim 14, wherein said reducing means (35, 36) comprise a projection (35) integral with a member (32) of each said lateral subframe (30), and an inclined surface (36) forming part of each said footrest (12), so that, when the central subframe (10) is deformed and each lateral subframe (30) relative to each rear lateral wheel (W1) is deformed into the minimum-size configuration, each of said projections (35) slides against the relative said inclined surface (36) to force the relative footrest (12) to rotate upwards about its hinge (C26) into a minimum-width configuration; whereas, conversely, when each lateral subframe (30) is restored to the unfolded running configuration of the tricycle (1000), the relative footrest (12) returns by force of gravity into an unfolded as-used configuration.

16. A foldable frame (100) for a tricycle (1000) powered by a force selected from the group consisting of: a physical force; a motor; a combination of a physical force and a motor;

the frame (100) comprising a number of subframes interconnected to fold the component members of said frame (100); and the frame (100) being characterized in that, by folding a central subframe (10) by exerting a force on it, two lateral subframes (30) supporting rear lateral wheels (W1) are folded from a first fully unfolded configuration to a second fully folded configuration; and, conversely, by unfolding the central subframe (10), the lateral subframes (30) are also unfolded; and the frame (100) comprising a front assembly (50) in turn comprising a front fork (51) supporting the front wheel (W2); said front fork (51) behing hinged by a first hinge (C29) to a connecting member (55) integral with a sleeve (53) rotating about an axis of rotation (b) inside a steering tube (54) integral with a member (11) of the central subframe (10); said front assembly (50) also comprising a handlebar (52) hinged by a second hinge (C30) to the connecting member (55); said front assembly (50) also comprising at last one fifth connecting rod (57) hinged at a first end by a third hinge (C31) to the front fork (51), and at a second end by a fourth hinge (C32) to the handlebar (52), so that, when the handlebar (52) is rotated downwards about the second hinge (C30), the consequent movement of the fifth connecting rod (57) rotates the front fork (51) rearwards (direction D) about the first hinge (C29), and, conversely, when the handlebar (52) is raised into the running configuration, the front fork (51) is also rotated frontwards (opposite direction to direction D) into the running configuration; said frame (100) being characterized in that said first (C29) and second (C30) hinge have axes of rotation parallel to each other and perpendicular to the longitudinal plane (a) of symmetry of the front wheel (W2), so that, when the handlebar (52) is rotated about the second hinge (C30) in the longitudinal plane (a) of symmetry, the front fork (51) also rotates about the first hinge (C29), while maintaining its own longitudinal plane of symmetry coincident with the longitudinal plane (a) of symmetry of the frame (100).

17. A frame (100) as claimed in claim 16, and also comprising a hook (61) which rotates with respect to a portion (55a) of said connecting member (55) about an axis (c) substantially parallel to the axis of rotation (b) of the sleeve (53); said frame (100) being characterized in that the arc of rotation of said hook (61) is defined at one end by a first stop member (62) integral with said portion (55a) of the connecting member (55), and at the other end by a second stop member (63) also integral with said portion (55a) of the connecting member; the first of these two limit positions corresponding to a configuration in which the hook (61) locks the handlebar (52) in the running configuration, and the second of these two limit positions corresponding to a configuration allowing the handlebar (52) to rotate about said second hinge (C30); elastic means (64) being provided to control the position of the hook (61); said elastic means (64) being connected at one end to a projection (66) of said portion (55a) of the connecting member (55), and at the other end of a projection (65) of the hook (61); the two projections (66, 65) being so located with respect to the axis of rotation (c) of the hook (61) as to only allow the hook (61) to assume stable configurations corresponding to said two limit positions.

18. A frame (100) as claimed in claim 17, characterized by comprising a mechanism whereby, when the hook (61) is set to the position allowing rotation of the handlebar (52) about said second hinge (C30), the connecting member (55) and the front fork (51) fitted to the connecting member are locked in a compulsory configuration.

19. A frame (100) as claimed in claim 18, characterized in that said mechanism comprises said projection (65) of the hook (61), and a seat (67) formed on the steering tube (54); the projection and the seat being so located that, when the hook (61) is set to the position allowing rotation of the handlebar (52) about said second hinge (C30), the projection (65) engages the seat (67) to prevent the connecting member (55), and consequently the front fork (51), from rotating about the axis (b) of rotation of the sleeve.

20. A frame (100) as claimed in claim 19, characterized in that said seat (67) is so located on the steering tube (54) that the connecting member (55) is locked in such a position that the axis of the first hinge (C29) of the front fork (51) is perpendicular to the longitudinal plane (a) of symmetry of the frame (100), so that, when the handlebar (52) is rotated about the second hinge (C30) from the running to the minimum-size configuration, the front fork (51) rotates about the first hinge (C29) while maintaining its own longitudinal plane of symmetry coincident with the longitudinal plane (a) of symmetry of the frame (100), thus inserting the front wheel (W2) between the two arms defining the front portion (11a) of a member (11) of the central subframe (10).

21. A frame (100) as claimed in claim 17, characterized in that, when set to the position locking the handlebar (52) in the running configuration, the hook (61) simultaneously presses a switch (69a) forming part of a safety device (68) and which cuts off an electric circuit powering a linear actuator (60), thus preventing operation of the linear actuator.

22. A frame (100) as claimed in claim 17, the frame (100) also comprising an electric drive motor (M); and the frame (100) being characterized in that, when the hook (61) is set to the position allowing rotation of the handlebar (52) about the second hinge (C30), the hook (61) simultaneously presses a switch (69b) also forming part of the safety device (68) and which cuts off an electric circuit powering said drive motor (M) of the tricycle (1000), thus preventing operation of the drive motor.

* * * * *